(12) United States Patent
Zhang et al.

(10) Patent No.: US 11,590,868 B2
(45) Date of Patent: Feb. 28, 2023

(54) VEHICLE ARMREST WITH AUTOMATIC RETRACTION

(71) Applicant: Lear Corporation, Southfield, MI (US)

(72) Inventors: Li Zhang, Shanghai (CN); Peng Wang, Shanghai (CN); Qian Xiang, Shanghai (CN); Yihua Huang, Shanghai (CN)

(73) Assignee: Lear Corporation, Southfield, MI (US)

( * ) Notice: Subject to any disclaimer, the term of this patent is extended or adjusted under 35 U.S.C. 154(b) by 3 days.

(21) Appl. No.: 17/210,898

(22) Filed: Mar. 24, 2021

(65) Prior Publication Data

US 2021/0331611 A1 Oct. 28, 2021

(30) Foreign Application Priority Data

Apr. 24, 2020 (CN) .......................... 202010334467.5

(51) Int. Cl.
*B60N 2/20* (2006.01)
*B60N 2/75* (2018.01)
*A47C 7/54* (2006.01)

(52) U.S. Cl.
CPC .............. *B60N 2/753* (2018.02); *B60N 2/20* (2013.01); *A47C 7/541* (2018.08); *A47C 7/543* (2013.01)

(58) Field of Classification Search
CPC ........ B60N 2/753; B60N 2/767; A47C 7/543; A47C 7/541
See application file for complete search history.

(56) References Cited

U.S. PATENT DOCUMENTS

| | | |
|---|---|---|
| 4,400,033 A | 8/1983 | Pietsch |
| 4,561,548 A | 12/1985 | Call |
| 4,881,778 A | 11/1989 | Stephenson et al. |
| 4,966,339 A | 10/1990 | Lu |
| 6,238,002 B1 | 5/2001 | Brewer et al. |
| 6,361,114 B1 | 3/2002 | Rumler |

(Continued)

FOREIGN PATENT DOCUMENTS

| | | |
|---|---|---|
| DE | 3043421 A1 | 7/1982 |
| DE | 29902474 U1 | 4/1999 |

(Continued)

OTHER PUBLICATIONS

European Search Report, Application No. EP20153669, dated May 27, 2020.

(Continued)

*Primary Examiner* — Syed A Islam
(74) *Attorney, Agent, or Firm* — MacMillan, Sobanski & Todd, LLC

(57) ABSTRACT

An armrest release mechanism includes a pivot bush. A release bracket is fixed to the pivot bush. An armrest pivot is supported on the pivot bush for relative rotational movement. A release board is also supported on the pivot bush for relative rotational movement. The release board is movable between a locked position and an unlocked position. An armrest lock is attached to the release bracket for relative movement. The armrest lock is also attached to the release board. When the release board is in the locked position the armrest lock is engaged with the armrest pivot to prevent movement of the armrest pivot relative to the pivot bush. When the release board is in the unlocked position the armrest lock is not engaged with the armrest pivot.

20 Claims, 7 Drawing Sheets

(56) References Cited

U.S. PATENT DOCUMENTS

| | | | |
|---|---|---|---|
| D572,982 S | 7/2008 | de Bretton Gordon | |
| 7,637,803 B2 | 12/2009 | Welch | |
| D657,634 S | 4/2012 | de Bretton Gordon | |
| D657,635 S | 4/2012 | de Bretton Gordon | |
| 8,177,301 B2 * | 5/2012 | Saito | B60N 2/767 297/411.32 |
| 8,721,403 B2 | 5/2014 | Welch | |
| D712,706 S | 9/2014 | de Bretton Gordon | |
| 9,493,098 B2 | 11/2016 | Marchesi | |
| D779,893 S | 2/2017 | deBretton Gordon et al. | |
| 9,758,074 B1 * | 9/2017 | Lin | B60N 2/933 |
| D886,542 S | 6/2020 | deBretton Gordon | |
| D911,122 S | 2/2021 | deBretton Gordon | |
| 10,993,535 B2 * | 5/2021 | Nill | A47C 1/0308 |

FOREIGN PATENT DOCUMENTS

| | | |
|---|---|---|
| GB | 2133681 A | 8/1984 |
| WO | 2019017807 A1 | 1/2019 |

OTHER PUBLICATIONS

GB Patents Act 1977: Search Report under Section 17, Application No. GB1901676.5, dated Jul. 16, 2019.

* cited by examiner

VEHICLE ARMREST WITH AUTOMATIC RETRACTION

BACKGROUND OF THE INVENTION

This invention relates to a vehicle seat armrest. More specifically, this invention relates to a vehicle seat armrest that is adapted to automatically move relative to the seat back in response to movement of the seat back.

Vehicles, such as passenger cars, include a vehicle seat for the comfort and safety of an occupant. The vehicle seat normally includes a seat bottom that the occupant sits on and a seat back that the occupant leans against. Some vehicle seats also include an armrest that is also provided for the comfort of the occupant.

In some types of vehicles, the seat back may be folded forward in order to provide room greater to access a space behind the vehicle seat. When the armrest is attached to the seat back, it can be desirable that the armrest move automatically to a retracted position when the seat back is folded forward in order to avoid the armrest engaging the seat bottom. An example of one such armrest is shown in U.S. Pat. No. 4,881,778. The '778 patent discloses an adjusting mechanism for automatically raising the armrest of the vehicle seat when the seat back is tilted forward. It would be advantageous to have an improved armrest release mechanism.

SUMMARY OF THE INVENTION

The invention relates to an improved structure for an armrest release mechanism for a vehicle seat. The mechanism includes a pivot bush. A release bracket is fixed to the pivot bush. An armrest pivot is supported on the pivot bush for relative rotational movement. A release board is also supported on the pivot bush for relative rotational movement. The release board is movable between a locked position and an unlocked position. An armrest lock is cooperatively attached to the release bracket for relative movement. The armrest lock is also cooperatively attached to the release board. When the release board is in the locked position the armrest lock is engaged with the armrest pivot to prevent movement of the armrest pivot relative to the pivot bush. When the release board is in the unlocked position the armrest lock is not engaged with the armrest pivot.

In another embodiment, the invention relates to an improved structure for a seat assembly. The assembly includes a seat base and a seat back attached for rotational movement relative to the seat base between a raised position and a forward position. A pivot bush is fixed to the seat back. A release bracket is fixed to the pivot bush. An armrest pivot is supported on the pivot bush for relative rotational movement. An armrest is supported on the armrest pivot for movement relative to the seat back between a use position and a stored position. A release board is also supported on the pivot bush for relative rotational movement between a locked position and an unlocked position. An armrest lock is cooperatively attached to the release bracket for relative movement. The armrest lock is also cooperatively attached to the release board. When the release board is in the locked position the armrest lock is engaged with the armrest pivot to prevent movement of the armrest pivot relative to the pivot bush. When the release board is in the unlock, position the armrest lock is not engaged with the armrest pivot.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
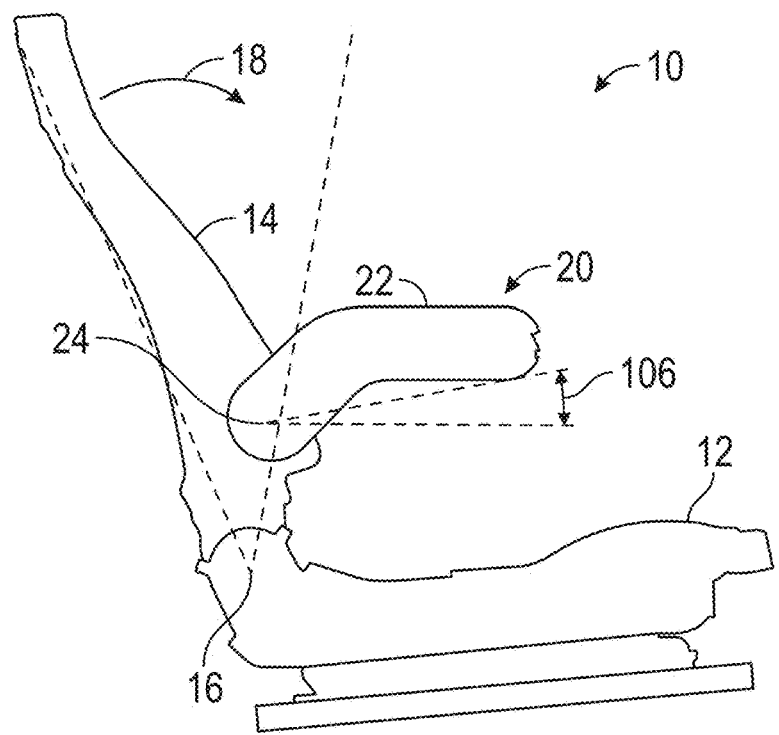
FIG. 1 is side elevational view of a vehicle seat assembly including an armrest assembly in accordance with this invention showing a seat back in a raised position and an armrest in a use position.
Figure 2:
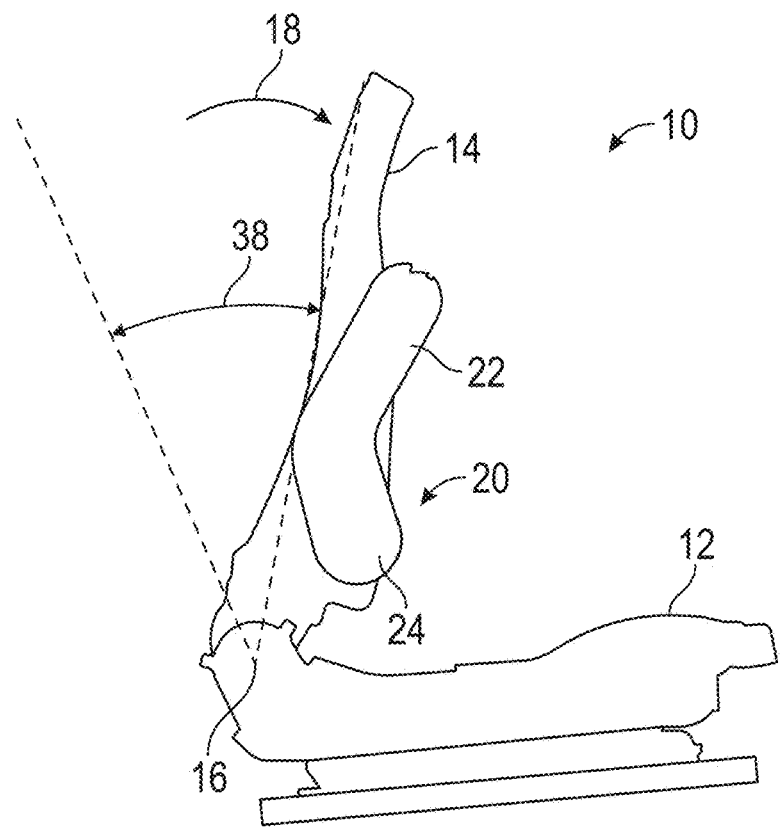
FIG. 2 is a side elevational view similar to FIG. 1 showing the seat back in a forward position and the armrest in a stored position.

Referring now to the drawings, there is illustrated in FIG. 1 a seat assembly, indicated generally at 10. The illustrated seat assembly 10 is a vehicle bucket seat, but may be any desired type of seat. The seat assembly 10 includes a seat base 12 and a seat back 14. The seat back 14 is attached for rotational movement relative to the seat base 12 about a back axis 16. The seat back 14 can be moved from a raised position, shown in FIG. 1, in a forward direction 18 to a forward position, shown in FIG. 2. The seat back 14 is typically moved to the forward position in order to allow easy access to a space behind the seat back 14. The seat back 14 may be moved farther in the forward direction 18 than the illustrated forward position, if desired.

The seat assembly 10 includes an armrest assembly, indicted generally at 20. The armrest assembly 20 includes an armrest 22 that is provided for the use of an occupant (not shown). The armrest 22 is attached to the seat back 14 for relative rotational about an arm axis 24 that is parallel to the back axis 16. The armrest 22 can be moved between a use position shown in FIG. 1 and a stored position shown in FIG. 2.

Figure 3:
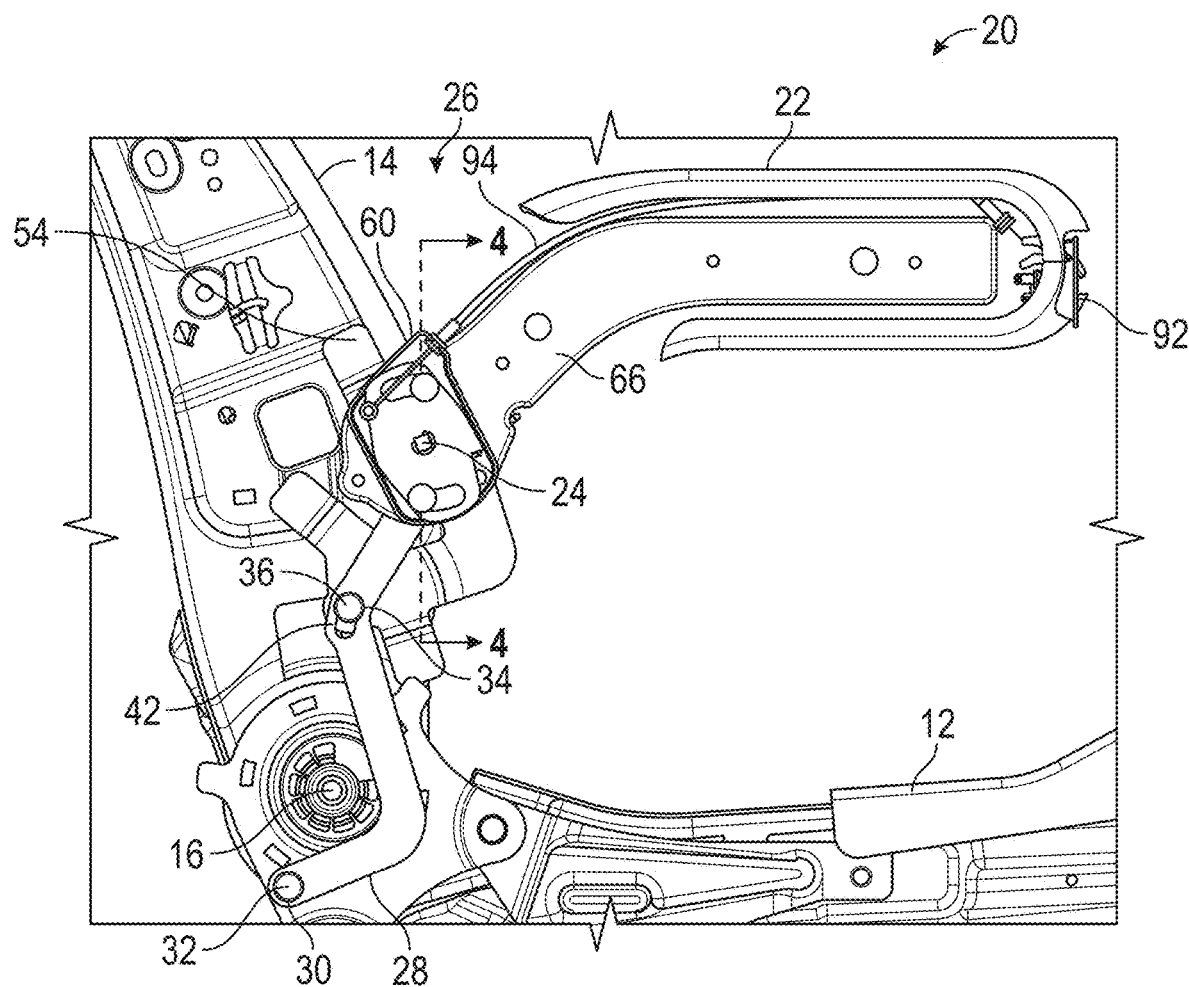
FIG. 3 is an enlarged view of a portion of the vehicle seat assembly of FIG. 1 showing portions of an armrest release mechanism.
Figure 4:
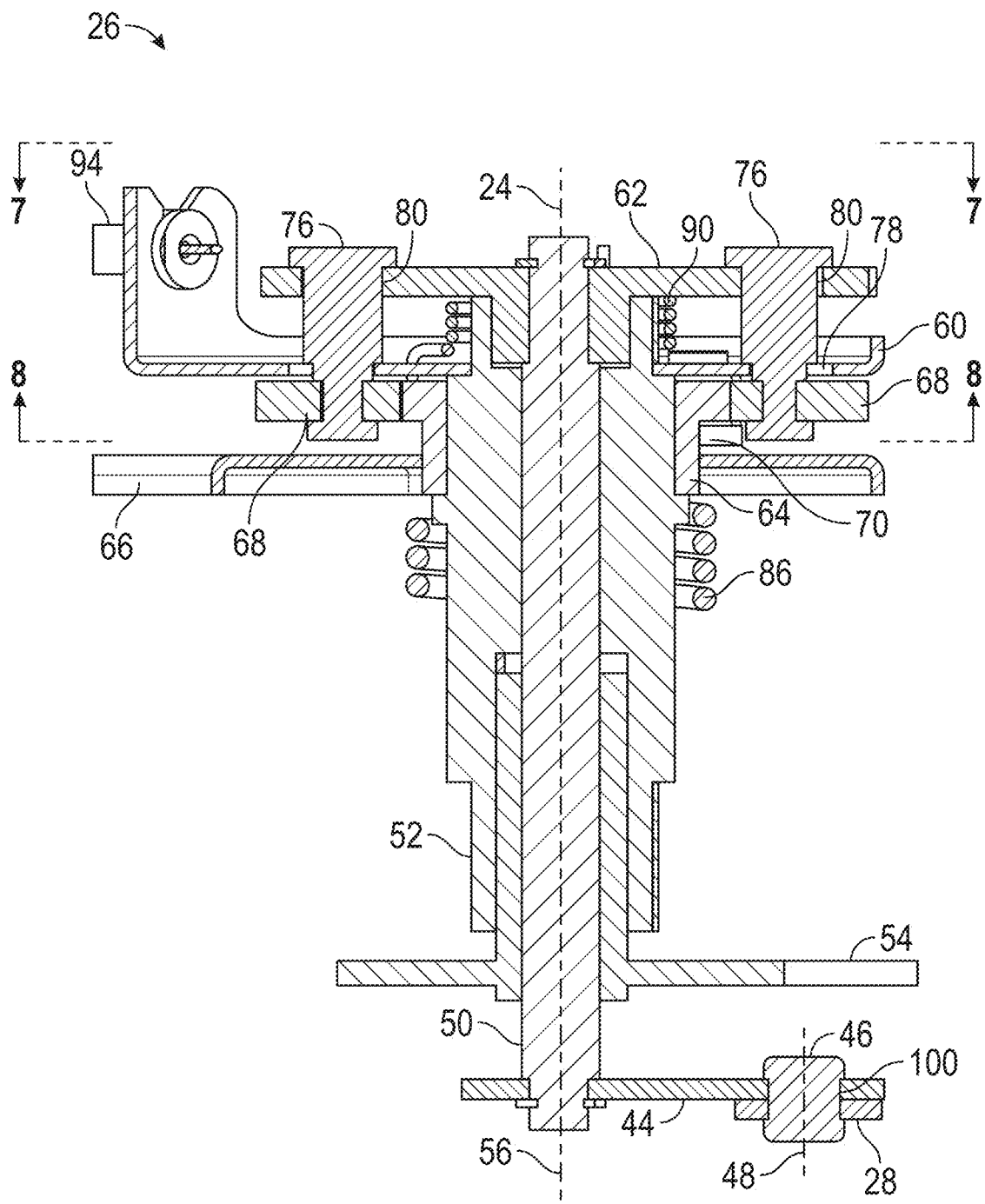
FIG. 4 is a cross-sectional view taken along line 4-4 of FIG. 3 showing components of the armrest release mechanism.

Referring to FIG. 3, there is illustrated an enlarged view of a portion of the seat assembly 10 from FIG. 1, with components removed so that an armrest release mechanism, indicated generally at 26, is visible. As will be described in detail below, the armrest release mechanism 26 is adapted to retain the armrest 22 in one of a plurality of desired positions relative to the seat back 14. The armrest release mechanism 26 is also adapted to automatically move the armrest 22 from the use position to the stored position when the seat back 14 is moved from the raised position to the forward position. Additionally, the armrest release mechanism 26 allows the occupant to manually move the armrest 22 between the use position and the stored position. FIG. 4 is a cross-sectional view taken along the line 4-4 of FIG. 3 showing components of the armrest release mechanism 26.

Figure 5:
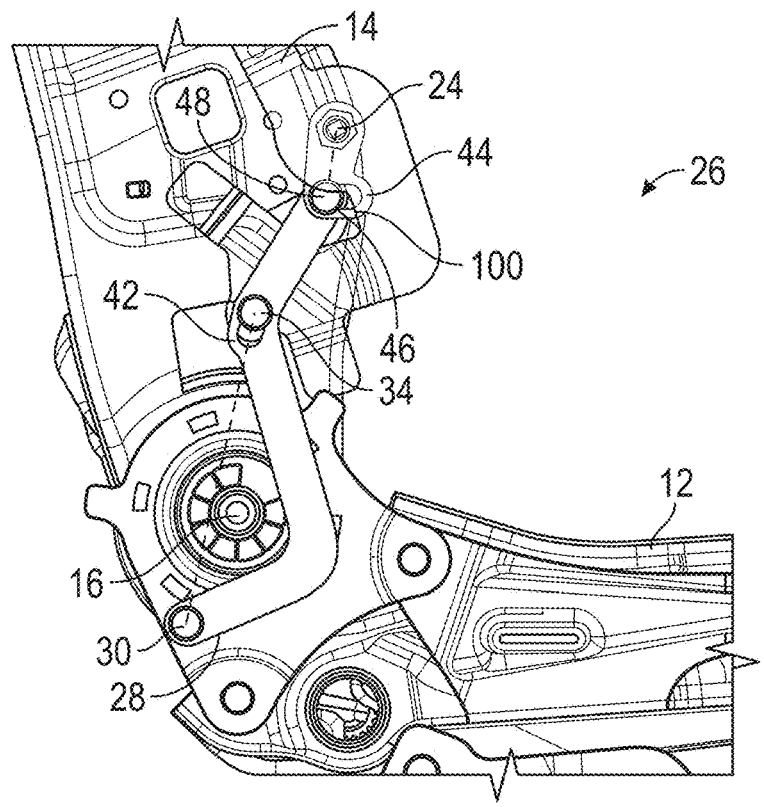
FIG. 5 is an enlarged view similar to FIG. 3 showing parts of the armrest release mechanism when the seat back is in the raised position.

Referring to FIG. 5, there is illustrated a view similar to FIG. 3, wherein parts of the armrest assembly 20 are not shown so that underlying components are visible. The armrest release mechanism 26 includes a seat link 28. The seat link 28 is attached to the seat base 12 for relative rotational movement about a base link axis 32. The illustrated base link axis 32 is parallel to the back axis 16. The illustrated seat link 28 has an S-shape, but may have any desired shape. The illustrated seat link 28 is attached to the seat base 12 by a base pin 30. The illustrated base pin 30 is a rivet that is attached to the seat link 28 and the seat base 12, but may be any desired connector. The seat link 28 is also attached to the seat back 14 for relative rotational movement about a back link axis 36. The back link axis 36 is also parallel to the back axis 16. The seat link 28 is also attached to the seat back 14 by a back pin 34. The illustrated back pin 34 is a rivet that is attached to the seat link 28 and the seat back 14, but may be any desired connector.

Figure 6:
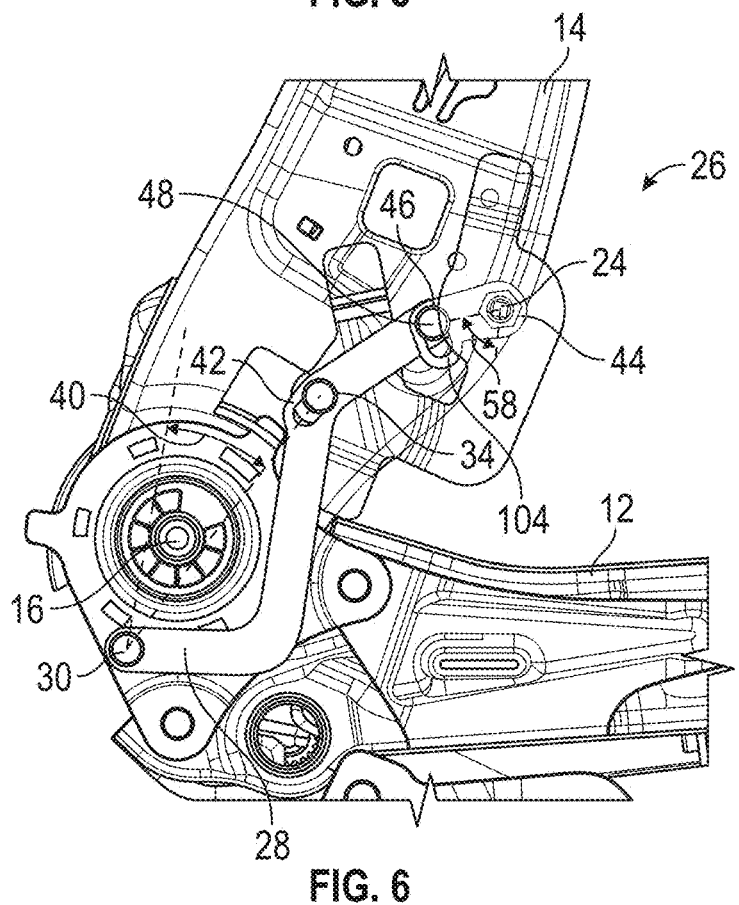
FIG. 6 is a view similar to FIG. 5 showing parts of the armrest release mechanism when the seat back is in the forward position.

Referring to FIG. 6, there is illustrated a view similar to FIG. 5, wherein the seat back 14 is shown moved to the forward position. When the seat back 14 is moved relative to the seat base 12 between the raised position (as shown in FIG. 5) and the forward position (as shown in FIG. 6), the seat link 28 is moved relative to both the seat base 12 and the seat back 14. In the illustrated embodiment, when the seat back 14 is moved relative to the seat base 12 between the raised position and the forward position, it is moved about the back axis 16 through a back angle 38 (shown on FIG. 2) of approximately 42°. Simultaneously, the seat link 28 is moved relative to the seat base 12 about the base link axis 32 through a seat link angle 40 (shown on FIG. 6) of approximately 25°. However, the components may have any desired ranges of relative movement.

When the seat back 14 is rotated relative to the seat base 12, the distance between the base pin 30 and the back pin 34 is changed. In order to accommodate this change, the armrest release mechanism 26 includes a seat link slot 42 that allows the back pin 34 to move linearly relative to the seat link 28. The illustrated seat link slot 42 is located in the seat link 28, but may be located in any desired location.

The armrest release mechanism 26 includes a pivot link 44 that is attached to the seat link 28 for relative rotational movement about a link axis 48. The link axis 48 is parallel to the back axis 16. The pivot link 44 is attached to the seat link 28 by a link pin 46. The illustrated link pin 46 is a rivet, but may be any desired connector.

Referring back to FIG. 4, the pivot link 44 is fixed to a pivot rod 50. The pivot rod 50 is supported in a pivot bush 52 for relative rotational movement. The pivot rod 50 is movable about a pivot axis 56 relative to the pivot bush 52. The pivot bush 52 is fixed to a bracket 54 that is fixed to the seat back 14 (not shown in FIG. 4). Thus, the pivot rod 50 and the pivot link 44 are supported on the seat back 14 for relative rotational movement about the pivot axis 56.

Referring back to FIGS. 5 and 6, when the seat link 28 is moved relative to the seat base 12 about the base link axis 32 through the seat link angle 40, the pivot link 44 is moved relative to the seat back 14 through a pivot angle 58. In the illustrated embodiment, the pivot angle 58 is approximately 32°. However, the pivot angle 58 may be any desired amount.

Referring back to FIG. 4, the armrest release mechanism 26 includes a release bracket 60 that is attached to the pivot bush 52. The release bracket 60 is fixed relative to the pivot bush 52 and is also fixed relative to the seat back 14. A release board 62 is attached to the pivot rod 50 and is supported adjacent to the release bracket 60. The release board 62 is movable relative to the release bracket 60 with the pivot rod 50 about the pivot axis 56.

Figure 7:
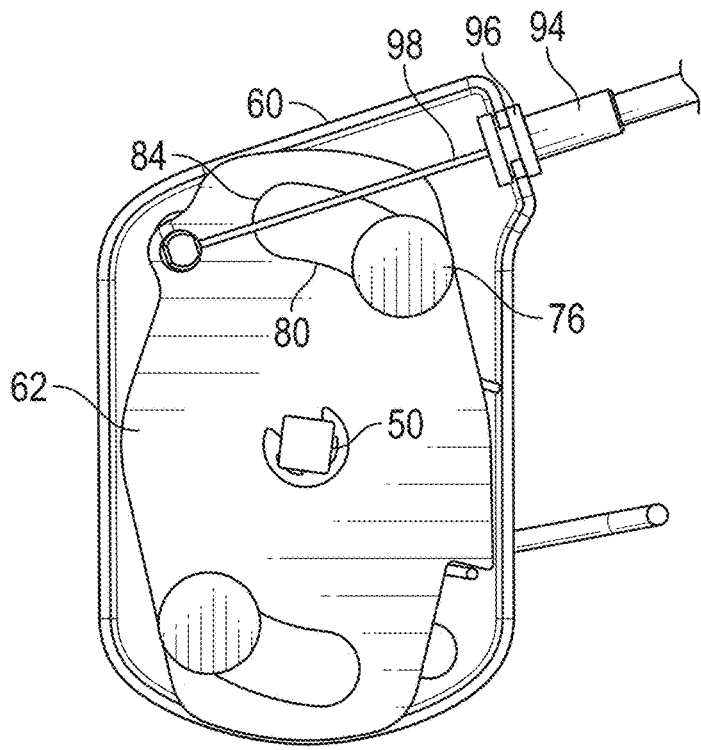
FIG. 7 is an enlarged cross-sectional view taken along line 7-7 of FIG. 4 when the seat back is in the raised position.
Figure 8:
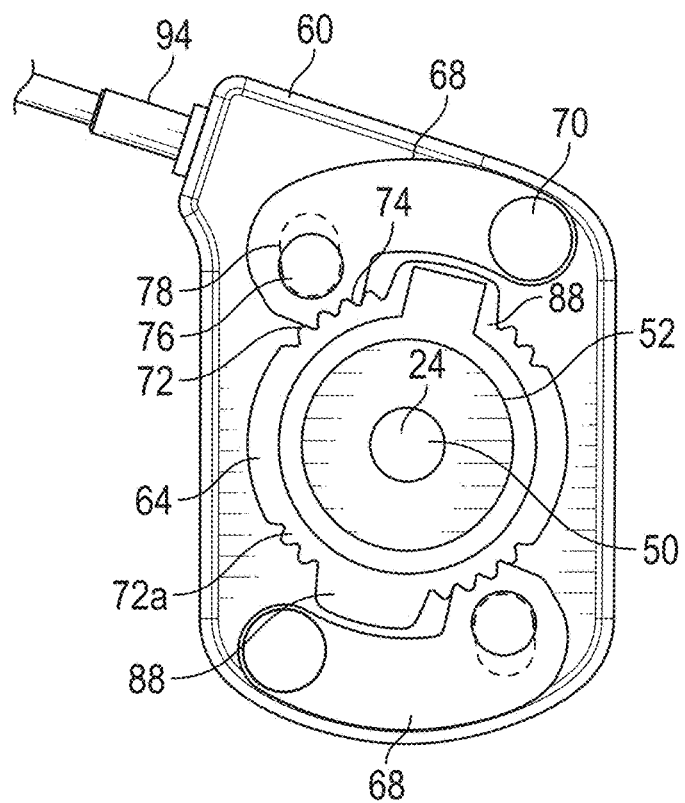
FIG. 8 is an enlarged cross-sectional view taken along line 8-8 of FIG. 4 when the seat back is in the raised position.

FIGS. 7 and 8 illustrate opposite sides of the release bracket 60. The release board 62 is shown in a locked position relative to the release bracket 60 in FIGS. 7 and 8. As shown in FIG. 8, an armrest pivot 64 is supported on the pivot bush 52 for relative rotational movement about the arm axis 24. An armrest strut 66 (shown in FIG. 3) of the armrest 22 is attached to the armrest pivot 64, and the armrest 22 is able to be rotated about the arm axis 24 with the armrest pivot 64. As previously described, the pivot rod 50 extends through the pivot bush 52. Thus, the pivot rod 50 and the pivot bush 52 are coaxial, and the arm axis 24 and the pivot axis 56 extend along a common axis.

As also shown in FIG. 8, the armrest release adjustment mechanism 26 includes an armrest lock 68 that retains the armrest pivot 64 in one of a plurality of positions relative to the pivot bush 52. Thus, the armrest lock 68 serves to retain the armrest 22 in one of a plurality of positions relative to the seat back 14. The illustrated armrest release mechanism 26 includes two armrest locks 68, but may include any desired number of such armrest locks 68.

The armrest lock 68 is cooperatively attached to the release bracket 60 for relative rotational movement by a lock pin 70. The illustrated lock pin 70 is a rivet, but may be any desired connector. The armrest lock 68 includes a lock surface 74 that is engaged with the armrest pivot 64 when the armrest lock 68 is in a locked position (as shown in FIG. 8) to retain the armrest pivot 64 in position relative to the pivot bush 52. In the illustrated embodiment, the lock surface 74 includes a plurality of teeth that interlock with cooperating teeth 72 on the armrest pivot 64, but the lock surface 74 may be any desired lock. When the armrest pivot 64 is retained in position relative to the pivot bush 52, the armrest 22 is also retained in position relative to the seat back 14.

The armrest lock 68 is attached to a lock release 76. As best shown in FIG. 4, the lock release 76 is a pin that extends from the armrest lock 68 through a release slot 78 in the release bracket 60. The release slot 78 extends substantially radially from the pivot axis 56, as shown in hidden line on FIG. 8. This allows the lock release 76 to be moved away from the pivot axis 56. The lock release 76 further extends into a cam slot 80 in the release board 62. Referring back to FIG. 7, the cam slot 80 has an arcuate shape and extends from a lock end 82 to an unlock end 84. The unlock end 84 is located farther from the pivot axis 56 than the lock end 82. As shown in FIG. 8, when the release board 62 is in the locked position, the lock release 76 is located in the lock end 82 of the cam slot 80.

Figure 9:
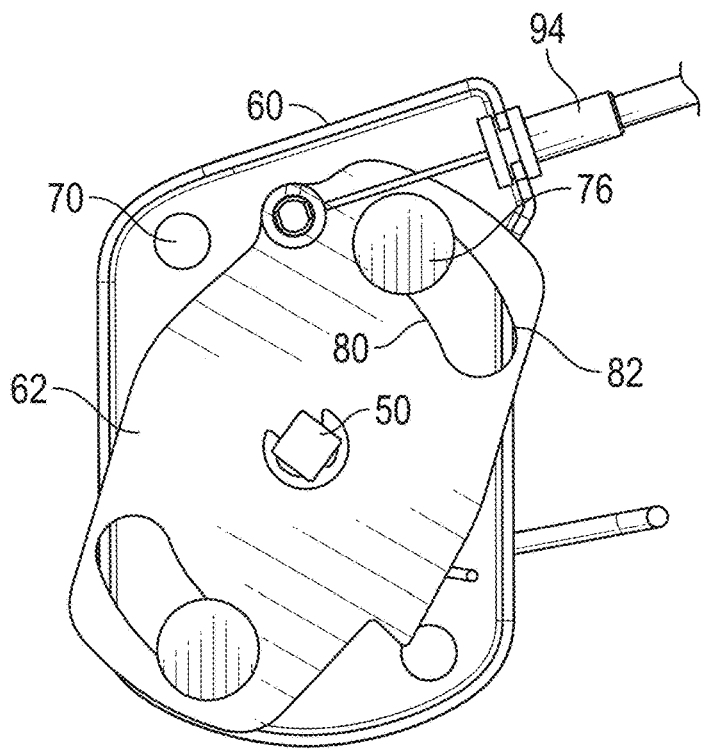
FIG. 9 is a view similar to FIG. 7 showing the seat back in the forward position.

Referring now to FIG. 9, there is illustrated a view similar to FIG. 7, with the release board 62 shown rotated relative to the release bracket 60 to an unlocked position. As previously described, when the seat back 14 is moved to the forward position (shown in FIG. 2), the pivot rod 50 is moved about the pivot axis 56 through the pivot angle 58. This causes the release board 62 to also rotate about the pivot axis 56 through the pivot angle 58 to the illustrated unlocked position.

The lock release 76 is located in the cam slot 80 in the release board 62. When the release board 62 is rotated relative to the release bracket 60, the lock release 76 engages the release board 62 and is moved toward the unlock end 84 of the cam slot 80. As previously described, the unlock end 84 is located farther from the pivot axis 56 than the lock end 82. Thus, the lock release 76 is moved away from the pivot axis 56.

Figure 10:
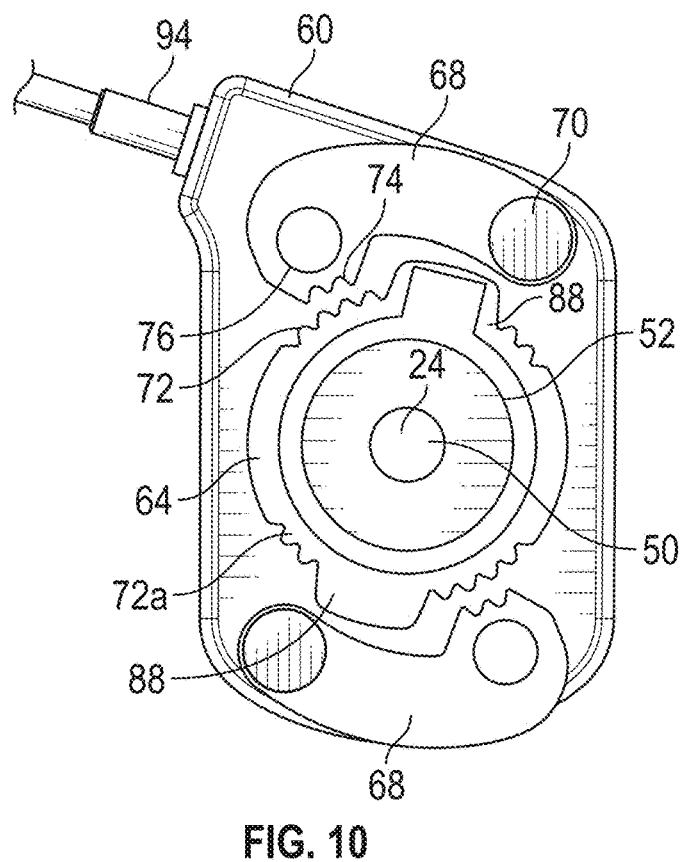
FIG. 10 is a view similar to FIG. 8 showing the seat back in the forward position.

Referring to FIG. 10, there is illustrated a view similar to FIG. 8, with the lock release 76 shown moved away from the pivot axis 56. Because the lock release 76 is attached to the armrest lock 68, the armrest lock 68 is moved relative to the release bracket 60. As a result, the lock surface 74 is moved away from the armrest pivot 64 and allows the armrest pivot 64 to be moved relative to the pivot bush 52. Thus, the armrest 22 is able to be moved relative to the seat back 14.

Referring back to FIG. 4, an armrest spring 86 is located around the pivot bush 52 and engages the pivot bush 52 and the armrest strut 66. The armrest spring 86 applies a force to the armrest strut 66 to bias the armrest 22 toward the stored position. Thus, when the seat back 14 is moved to the forward position (shown in FIG. 2), the release board 62 is rotated relative to the release bracket 60 (as shown in FIG. 9), the armrest lock 68 is moved out of engagement with the armrest pivot 64 (as shown in FIG. 10), and the armrest spring 86 biases the armrest 22 to the stored position (shown in FIG. 2).

Referring back to FIG. 10, the armrest release mechanism 26 includes a rotation stop 88 that limits the movement of the armrest 22 relative to the seat back 14. The illustrated rotation stop 88 is located on the armrest pivot 64 and engages the armrest lock 68 to limit how far the armrest 22 may be rotated. However, the rotation stop 88 may be in any desired location.

When the seat back 14 is moved from the forward position (shown in FIG. 2) to the raised position (shown in FIG. 1), the armrest release mechanism 26 will lock the armrest 22 in position relative to the seat back 14. Referring to FIG. 6, portions of the armrest release mechanism 26 are shown when the seat back 14 is in the forward position. When the seat back 14 is moved to the raised position, the seat link 28 is moved to the position shown in FIG. 5.

Referring to FIG. 4, the armrest release adjustmiet mechanism 26 includes a release spring 90 that engages the release bracket 60 and the release board 62. The release spring 90 biases the release board 62 toward the locked position, shown in FIG. 7. This, in turn, moves the armrest lock 68 into engagement with the armrest pivot 64 to prevent movement of the armrest 22 relative to the seat back 14. The movement of the release board 62 to the locked position also moves the pivot link 44 and the seat link 28 to the positions shown in FIG. 5.

Figure 11:
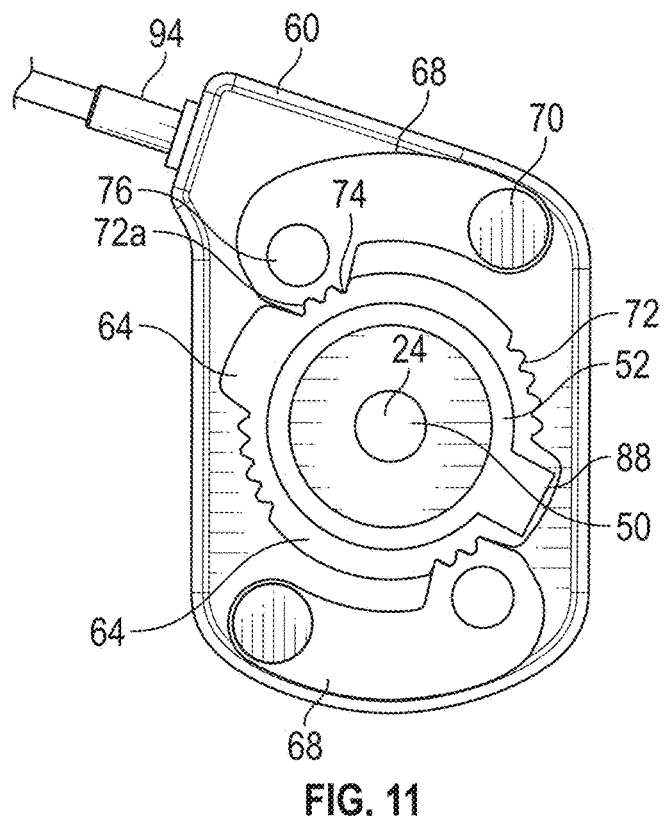
FIG. 11 is a view similar to FIG. 8 showing the armrest locked in a stored position.

Referring now to FIG. 11, there is illustrated a view similar to FIG. 8, showing the armrest pivot 64 rotated relative to the release bracket 60 when the release board 62 is in the locked position. As previously described, the lock surface 74 on the armrest lock 68 includes a plurality of teeth that interlock with cooperating teeth 72 on the armrest pivot 64 in order to lock the armrest 22 in place. The illustrated armrest pivot 64 includes a second set of cooperating teeth 72a that interlock with the teeth on the lock surface 74 to lock the armrest 22 in the stored position. When the armrest lock 68 is engaged with either of the teeth 72 and the teeth 72a, the armrest 22 is locked in position relative to the seat back 14. The armrest pivot 64 may include any desired number of sets of cooperating teeth 72 in any desired locations.

The previous description of the armrest release mechanism 26 describes automatic operation of the armrest 22. When the seat back 14 is moved to the forward position, the armrest 22 is unlocked and moved to the stored position. When the seat back 14 is moved to the raised position, the armrest 22 is locked in position relative to the seat back 14. The armrest release mechanism also allows the occupant to manually adjust the position of the armrest 22.

Referring back to FIG. 3, the armrest assembly 20 includes a release handle 92. The illustrated release handle 92 is located on a forward end of the armrest 22 but may be in any desired location. The release handle 92 is connected to a Bowden cable 94 that extends inside the armrest 22 to the release bracket 60.

Referring to FIG. 7, an outer cable portion 96 of the Bowden cable 94 is attached to the release bracket 60, and an inner cable portion 98 of the Bowden cable 94 is attached to the release board 62. When the release handle 92 is activated, the release board 62 is moved from the locked position (shown in FIG. 7) to the unlocked position (shown in FIG. 9). As previously described, this releases the armrest 22 for rotation relative to the seat back 14.

Figure 12:
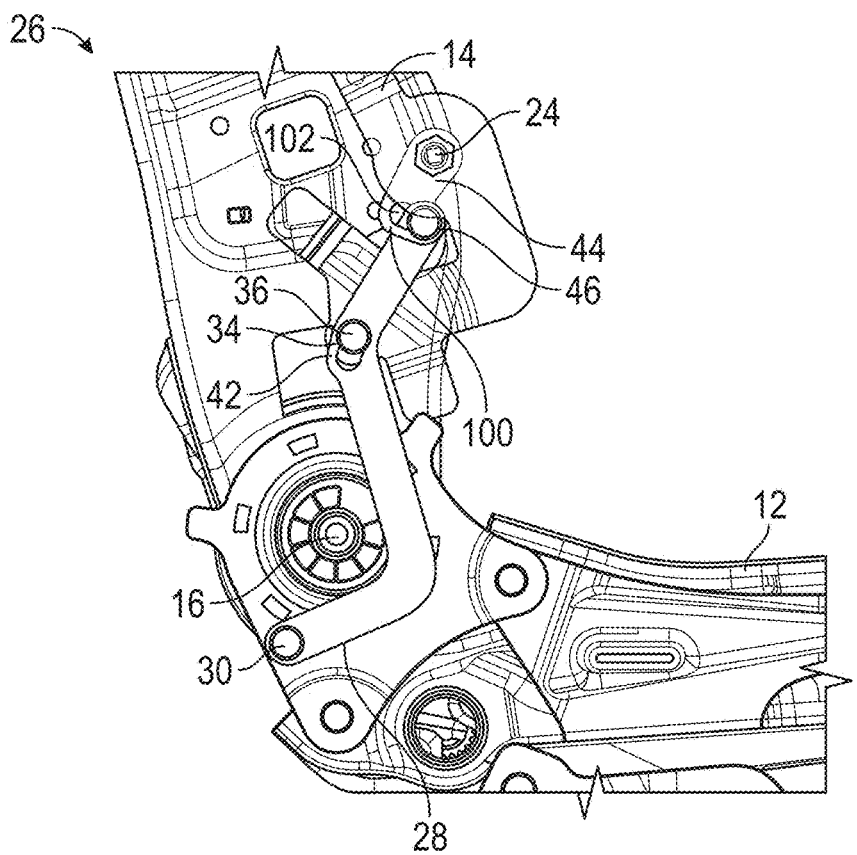
FIG. 12 is a view similar to FIG. 5 showing the armrest release adjustment mechanism after being manually released.

As previously described in reference to FIG. 4, when the release board 62 is rotated relative to the release bracket 60, the pivot rod 50 and the pivot link 44 are also rotated relative to the pivot bush 52. Referring to FIG. 12, a view similar to FIG. 5 is shown with the pivot link 44 rotated relative to the seat back 14. The armrest release mechanism 26 includes a pivot link slot 100 defined in the pivot link 44. The link pin 46 is located in the pivot link slot 100 and is normally located in an automatic end 102 of the pivot link slot 100 (as shown in FIGS. 5 and 6), but moves to a manual end 104 of the pivot link slot 100 (as shown in FIG. 12) when the release board 62 is manually moved to the unlocked position.

When the release handle 92 is released, the release spring 90 biases the release board 62 to the locked position. Thus, the occupant may activate the release handle 92, move the armrest 22 to a desired position, and release the release handle 92 in order to lock the armrest 22 in position relative to the seat back 14.

This allows the occupant to move the armrest 22 between the use position and the stored position. Additionally, referring back to FIG. 8, in the illustrated embodiment, the cooperating teeth 72 on the armrest pivot 64 includes a larger number of teeth than the lock surface 74 on the armrest lock 68. This allows the occupant to change the position of the armrest 22 relative to the seat back 14 while keeping the armrest 22 in the use position. In the illustrated embodiment, the armrest 22 can be adjusted through a use comfort range 106 (shown on FIG. 1) of approximately 10°. However, the armrest release mechanism 26 may provide any desired comfort range 106.

The principle and mode of operation of this invention have been explained and illustrated in its preferred embodiment. However, it must be understood that this invention may be practiced otherwise than as specifically explained and illustrated without departing from its spirit or scope.

What is claimed is:

1. An armrest release mechanism for a seat assembly having a seat back and an armrest, the armrest release mechanism comprising:

a pivot bush that is adapted to be connected to the seat back of the seat assembly;

a release bracket that is fixed to the pivot bush;

an armrest pivot that is supported on the pivot bush for relative rotational movement;

a release board that is adapted to be fixed to the armrest of the seat assembly and supported on the pivot bush for relative rotational movement between a locked position and an unlocked position, the release board further including a pivot link that is adapted to be moved in response to movement of the seat back; and an armrest lock that is attached to the release bracket for relative movement, the armrest lock cooperatively attached to the release board such that:

when the release board is in the locked position, the armrest lock is engaged with the armrest pivot to prevent movement of the armrest pivot relative to the pivot bush, and when the release board is in the unlocked position, the armrest lock is not engaged with the armrest pivot.

2. The armrest release mechanism of claim 1, wherein the release board is rotatable relative to the pivot bush about a pivot axis, and wherein the armrest lock is cooperatively attached to the release board by a lock release that is supported by the release bracket for substantially radial movement relative to the pivot axis.

3. The armrest release mechanism of claim 2, wherein a portion of the lock release is located in an arcuately-shaped cam slot in the release board.

4. The armrest release mechanism of claim 3, wherein a portion of the lock release is located in a release slot in the release bracket.

5. The armrest release mechanism of claim 1, further including a release spring that biases the release board to the locked position.

6. The armrest release mechanism of claim 1, wherein the release board is moved from the locked position to the unlocked position when a seat back of a seat assembly is moved from a raised position to a forward position.

7. The armrest release mechanism of claim 1, wherein the release board is moved from the unlocked position to the locked position when a seat back of a seat assembly is moved from a forward position to a raised position.

8. The armrest release mechanism of claim 1, further including a release handle that is connected to the release board for selectively moving the release board between the locked position and the unlocked position.

9. A seat assembly comprising:

a seat base;

a seat back supported for rotational movement relative to the seat base;

a pivot bush that is fixed to the seat back;

a release bracket that is fixed to the pivot bush;

an armrest pivot that is supported on the pivot bush;

an armrest supported on the armrest pivot for movement relative to the seat back between a use position and a stored position;

a release board that is fixed to the armrest and supported on the pivot bush for relative rotational movement between a locked position and an unlocked position the release board further including a pivot link that is moved in response to movement of the seat back; and an armrest lock that is attached to the release bracket for relative movement, the armrest lock cooperatively attached to the release board wherein:

when the release board is in the locked position the armrest lock is engaged with the armrest pivot to prevent movement of the armrest pivot relative to the pivot bush, and when the release board is in the unlocked position the armrest lock is not engaged with the armrest pivot.

10. The seat assembly of claim 9, wherein the release board is rotatable relative to the pivot bush about a pivot axis, and wherein the armrest lock is cooperatively attached to the release board by a lock release that is supported by the release bracket for substantially radial movement relative to the pivot axis.

11. The seat assembly of claim 10, wherein a portion of the lock release is located in an arcuately-shaped cam slot in the release board.

12. The seat assembly of claim 11, wherein a portion of the lock release is located in a release slot in the release bracket.

13. The seat assembly of claim 9, further including a release spring that biases the release board to the locked position.

14. The seat assembly of claim 9, further including a seat link that is attached to the seat base for relative rotational movement and is attached to the seat back for relative rotational movement, and the pivot link is fixed to the release board and is attached to the seat link for relative rotational movement.

15. The seat assembly of claim 14, wherein when the seat back is moved to a forward position the release board is moved to the unlocked position.

16. The seat assembly of claim 9, further including an armrest spring that biases the armrest to the stored position.

17. The armrest release mechanism of claim 6, wherein the release board is moved from the locked position to the unlocked position when a seat back of a seat assembly is moved from a raised position to a forward position.

18. The armrest release mechanism of claim 6, wherein the release board is moved from the unlocked position to the locked position when a seat back of a seat assembly is moved from a forward position to a raised position.

19. The armrest release mechanism of claim 6, further including a release handle that is connected to the release board for selectively moving the release board between the locked position and the unlocked position.

20. The seat assembly of claim 1, further including a seat link that is attached to the seat base for relative rotational movement and is attached to the seat back for relative rotational movement, and the pivot link is fixed to the release board and is attached to the seat link for relative rotational movement.

\* \* \* \* \*